United States Patent [19]

Precoul

[11] 4,227,438
[45] Oct. 14, 1980

[54] WEAPON SYSTEM, NOTABLY INFANTRY ANTI-TANK WEAPON

[75] Inventor: Michel Precoul, Paris, France

[73] Assignee: Societe d'Etudes, de Realisations et d'Applications Techniques, Paris, France

[21] Appl. No.: 927,570

[22] Filed: Jul. 24, 1978

[30] Foreign Application Priority Data

Sep. 9, 1977 [FR] France .............................. 77 27285

[51] Int. Cl.³ .............................................. F41F 3/04
[52] U.S. Cl. .................................. 89/1.816; 102/49.3
[58] Field of Search ................. 89/1.816, 1.818, 1.806, 89/1.8; 102/49.3, 56 SC

[56] References Cited

U.S. PATENT DOCUMENTS

| 3,494,249 | 2/1970 | Choat | 102/49.3 X |
| 3,946,638 | 3/1976 | Cobb | 89/1.816 X |
| 3,990,355 | 11/1976 | Looger et al. | 89/1.816 |
| 4,092,899 | 6/1978 | Lienau | 89/1.816 |
| 4,108,700 | 8/1978 | Clodfelter | 285/423 X |

FOREIGN PATENT DOCUMENTS

| 2331031 | 9/1975 | Fed. Rep. of Germany | 89/1.819 |
| 1410375 | 7/1964 | France | 89/1.816 |
| 1520421 | 10/1966 | France | 89/1.816 |
| 2311271 | 12/1976 | France | 102/56 SC |

Primary Examiner—David H. Brown
Attorney, Agent, or Firm—Davis, Hoxie, Faithfull & Hapgood

[57] ABSTRACT

Weapon system, notably of the light anti-tank type for infantry, which is fully consumable, which comprises a launching tube acting as a sealed tactical container and a rocket, preferably of the hollow charge type, and a rocket acceleration propulsion unit provided with a casing consisting of a compound fibre-and-resin assembly, preferably of the aramid-and-epoxy type, said casing consisting of two sections, i.e. an inner sleeve and an external structure.

6 Claims, 7 Drawing Figures

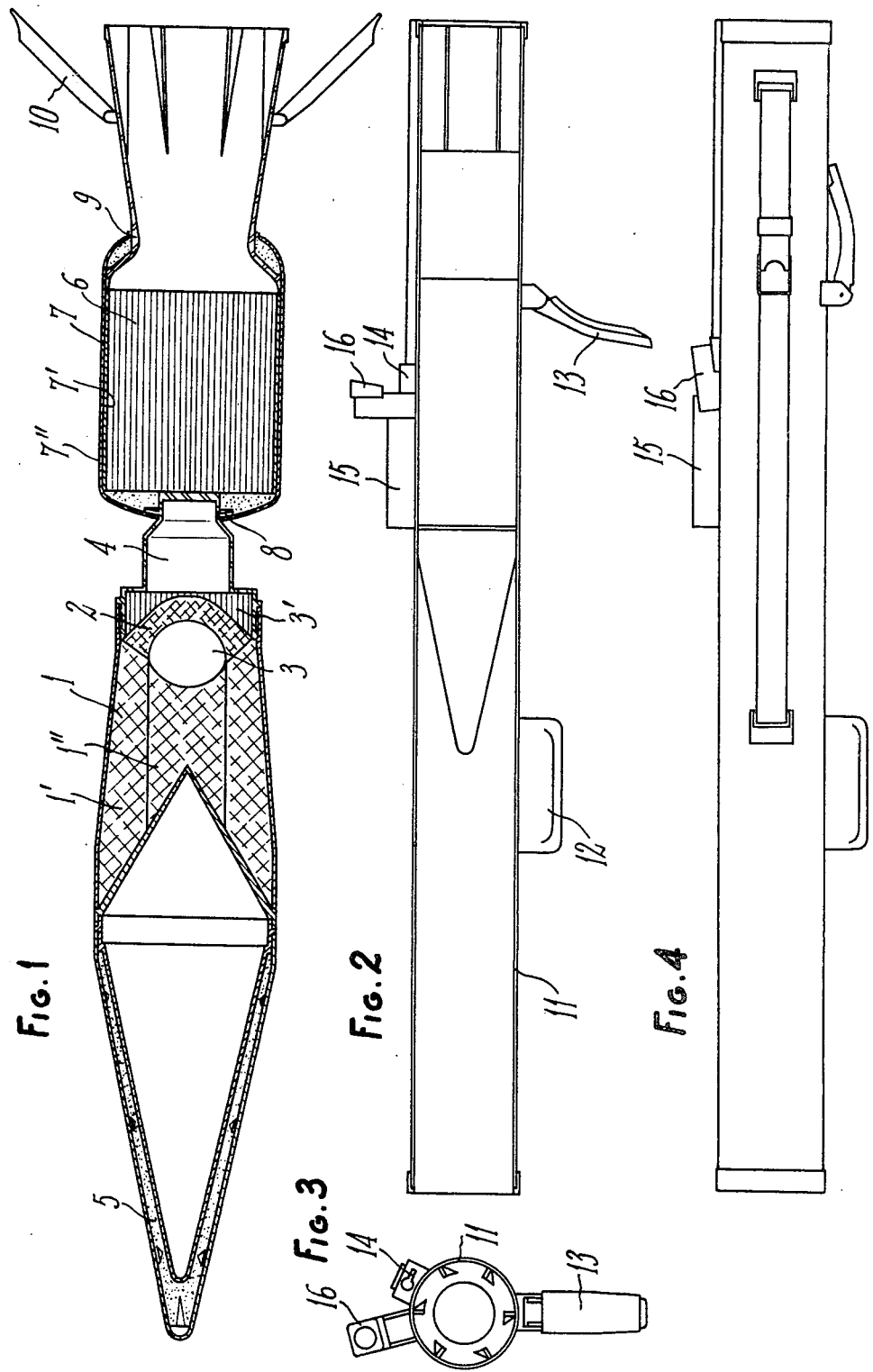

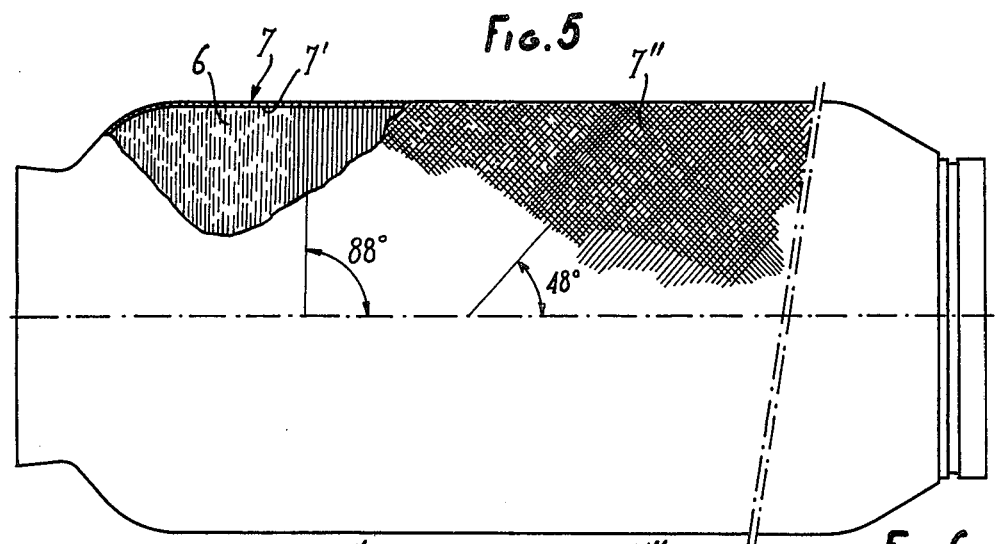
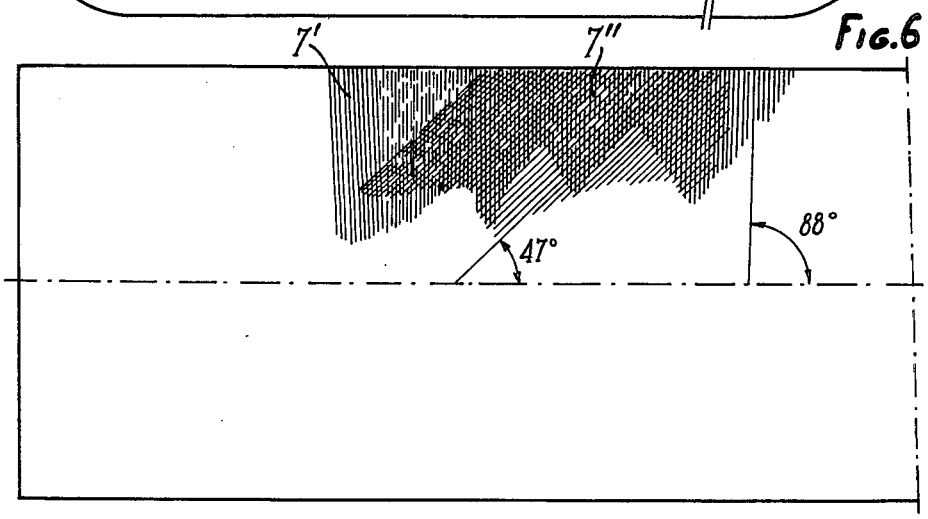
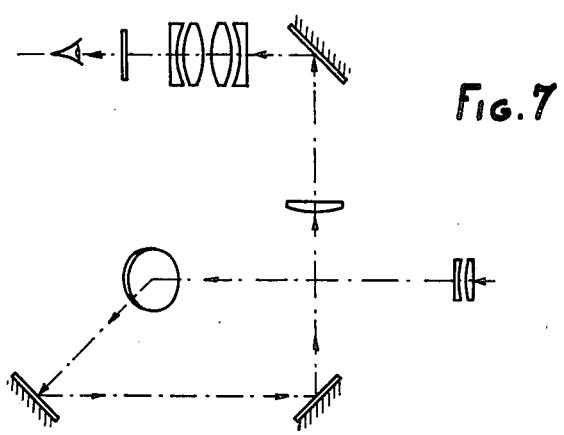

WEAPON SYSTEM, NOTABLY INFANTRY ANTI-TANK WEAPON

Of late years tanks have become decisive elements on battlefields. Consequently, infantrymen have been equipped with weapons designed for destroying tanks, notably weapons incorporating a hollow-charge nose or head. However, rapid and recent developements in armoured vehicles made it necessary to find new anti-tank weapons for infantrymen.

In fact, the use of improved, more efficient and better shaped armouplatings increased the tank protection, and at the same time the tactical mobility of armoured vehicles was also improved very considerably.

On the other had, the multivarious tasks devolved to foot-soldiers in modern warfare make it necessary to simplify the use, and reduce the weight, of anti-tank weapons and equipments. Therefore, new infantry anti-tank weapons should have inter alia the following properties:

an end effect considerably enhanced in comparison with that of existing weapons and equipments, efficient operation at great incidence angles and notwithstanding the obstacles encountered before striking the armour-plating, relatively flat trajectory enabling the firing under fixed sight conditions up to ranges corresponding to several hundreds of meters, low ballistic dispersion, mass and over-all dimensions not in excess of those of an ordinary gun, fully consumable weapon and ammunition system.

In consideration of these preliminary remarks, it is the essential object of the present invention to proivde a weapon system, notably of the infantry anti-tank type, of which the general conception and the conception of all the component elements are determined with a view to meet the above-listed requirements.

Preferably, the weapon system according to this invention, which is fully consumable, consists of a rocket-thrower or launching unit, comprising a sealed tactical container and a hollow-charge rocket, and is characterized in that, in order to minimize the mass of the system according to the invention, the structure of the launching tube and that of the rocket propulsion unit consist of a fibre-and-resin and preferably aramid-and-epoxy coiled complex.

Also preferably, the structure of said propulsion unit consists of two sections, i.e. an inner sleeve and an external structure according to a novel method described hereinafter with reference to a typical and exemplary form of embodiment of the invention.

The rocket tube according to this invention is equipped with optical means of which the lens unit is rigid with the tube, and the eye-piece or occular section and the aiming shoulder arm thereof are of the folding type in order to secure the firing with the proper lines of centres and bearings while facilitating the transport with a "smooth" weapon.

According to this invention, the hollow charge utilized in this anti-tank weapon comprises preferably composite explosives that are moulded and glued in situ:

either according to the method claimed by the same Applicants in their French patent application No. 75 37566 filed on Dec. 9, 1975 published under No. 2,334,936, or according to the annular arrangements claimed by the same Applicants in their French patent application No. 76 28964 filed on Sept. 27, 1976 published under No. 2,365,774.

For starting this explosive nose, the rocket according to this invention utilizes preferably:

a gas-derivation type electromagnetic fuse as claimed by the same Applicants in the French patent application No. 69 41707 filed on Dec. 3, 1969 published under No. 2,070,389 and allowed Aug. 16, 1971;

a cap incorporating an electric contact of the conductive gel type as claimed by the same Applicants in the French patent application No. 71 37614 filed on Oct. 26, 1971 published under No. 2,157,152 and granted May 7, 1973.

According to the present invention, the propellant charge used in the rocket consists essentially:

of a spiral cluster of spiral-shaped propergol elements such as claimed in the Applicants' French patent application No. 75 15371 filed on May 16, 1975 published under No. 2,157,152 and granted May 7, 1973 and its First Patent of Addition No. 76 00323 of January 8, 1976, published under No. 2,337,873;

of a suspension plate consisting of polyurethane cast or injected at the front end of said blocks.

All of the above-identified French applications have been open to the public since prior to the filing date of this application—July 24, 1978.

The various features and advantages characterizing this invention will appear as the following description proceeds. However, it is pointed out that the forms of embodiment described or suggested herein should not be construed as limiting the scope of the invention since they constitute only typical examples to which various modifications may be brought, notably in connection with the mode of construction, shapes, proportions, relative arrangement of parts, etc. . .

Referring to the accompanying drawing:

FIG. 1 illustrates diagrammatically a longitudinal axial section of the invention;

FIG. 2 is a diagrammatic section showing the weapon system ready for firing;

FIG. 3 is an end view of the weapon shown in FIG. 2; and

FIG. 4 is a diagrammatic illustration of the weapon system in the transport position.

FIGS. 5 and and 6 are diagrammatic illustrations on an enlarged scale of the arrangement of the coiled fiber and resin structures of the present invention and FIG. 7 is a diagrammatic illustration of a set of diopters for use in the present invention.

Referring first to FIG. 1, the hollow-charge head or cap consists of an explosive, preferably of the composite, moulded and cemented type, or of the multicomposition type, shown diagrammatically at 1 and forming for example concentric annular layers 1' and 1".

The priming system comprises for example a cap-shaped block 2 and an ovoid screen 3 bearing against a base member 3'.

The energy required for firing the rocket is preferably of the self-generating type produced by an electromagnetic induction system 4 armed by gas derivation, in order to impart the necessary safety of operation; the muzzle safety is obtained for example by means of a mechanical delay-action device (not shown).

The electric contact ogive or conical point 5 consists of a flexible material of conductive gel and is suitable for very high incidence operation.

In the form of embodiment illustrated by way of example the propulsive charge consists of a cluster of thin bevelled spiral-shaped propergol strips having their heads embedded in a suitable varnish, preferably of the polyurethane type.

The propulsion unit 7 for accelerating this charge consists, according to the present invention:

of a sleeve 7' of aramid fibres coiled at to a wide-angle pitch in order to obtain a very high degree of radial strength;

of a main structure 7" of aramid fibres coiled directly on the sleeve 7' previously loaded with the propulsive charge 6, and on suitable inserts. These inserts constitute the rear portion of the fuse 8 forming the head to propulsion unit connection, and the tuyere 9 on which the stabilizing spread-out fins 10 are pivotally mounted.

The rocket is enclosed in a launching tube 11 (FIG. 2) made of coiled aramid fibres and equipped with means 12 for supporting the tube and also with fire aiming means such as a normally retracted shoulder element 13 and a member 14 for firing the propeller.

The sighting, which must be as accurate as possible in order to impart the necessary degree of precision to the weapon, is through the simplified optical telescope 15 integrated in the launching tube 11.

The lateral off-set of the retractable firing-sight 16 is obtained by tipping action, the optical coupling being provided for example by means of a pair of diopters or through optical fibres.

FIG. 2 illustrates the telescope in the spread-out or operative position, FIG. 4 shows the telescope in the retracted or transport position.

There is schematically shown in FIGS. 5 and 6 of the appended drawings, the winding according to a wide angle pitch (for example, an 88° angle) of the fibers composing the sleeve 7', on the one hand, and on the other hand, the winding (according to, for example, a 48° angle) of the main, structure 7" of aramid fibers wound directly on the sleeve 7' as indicated above.

I claim is:

1. A disposable anti-tank weapon system for infantry comprising
    I. a launching tube acting as a sealed container and
    II. a rocket propelled projectile unit comprising
        A. an explosive head,
        B. a rocket propulsion unit and
        C. a fuse which interconnects the explosive head and the propulsion unit,
        D. said rocket propulsion unit comprising
            1. a propulsive charge,
            2. a tuyere at the after end of the propulsion unit,
            3. an inner sleeve loaded with said propulsive charge and made of a coiled fiber and resin structure, there being a wide pitch angle between adjacent fiber coils and
            4. an external structure made of a coiled fiber and resin structure, the coils of which are coiled directly on said inner sleeve and extend over said fuse and said tuyere.

2. A disposable anti-tank weapon system according to claim 1, wherein said fiber and resin structure of said inner sleeve is of the aramid fiber and epoxy type.

3. A disposable anti-tank weapon system according to claim 1, wherein said explosive head is of the hollow-charge type.

4. A disposable anti-tank weapon system according to claim 1, wherein said launching tube is provided with a built-in sighting telescope whose lens system is rigid with respect to said tube and having a folding eyepiece.

5. A disposable anti-tank weapon system according to claim 4, wherein the optical coupling between the eyepiece and the sighting telescope lens system is through a set of diopters.

6. A disposable anti-tank weapon system according to claim 4, wherein the optical coupling between the eyepiece and the sighting telescope lens system is through optical fibers.

* * * * *